United States Patent
Mottin et al.

(10) Patent No.: US 9,869,189 B2
(45) Date of Patent: Jan. 16, 2018

(54) METHOD FOR FRICTION WELDING A BLADE ONTO A TURBINE ENGINE ROTOR DISC; CORRESPONDING INTEGRAL BLADE DISC

(71) Applicant: Snecma, Paris (FR)

(72) Inventors: Jean-Baptiste Mottin, Moissy Cramayel (FR); Marc Jacky Vassault, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 300 days.

(21) Appl. No.: 14/647,679

(22) PCT Filed: Nov. 26, 2013

(86) PCT No.: PCT/FR2013/052863
§ 371 (c)(1),
(2) Date: May 27, 2015

(87) PCT Pub. No.: WO2014/083275
PCT Pub. Date: Jun. 5, 2014

(65) Prior Publication Data
US 2015/0300182 A1   Oct. 22, 2015

(30) Foreign Application Priority Data
Nov. 28, 2012   (FR) ..................... 12 61367

(51) Int. Cl.
*F01D 5/30*   (2006.01)
*B23P 6/00*   (2006.01)
(Continued)

(52) U.S. Cl.
CPC ........ *F01D 5/3061* (2013.01); *B23K 20/1205* (2013.01); *B23K 20/1295* (2013.01);
(Continued)

(58) Field of Classification Search
CPC .......... F01D 5/3061; F01D 5/005; F01D 5/02; F01D 25/28; F01D 25/285;
(Continued)

(56) References Cited

U.S. PATENT DOCUMENTS

| 4,934,583 A | 6/1990 | Patsfall |
| 8,006,380 B2 * | 8/2011 | Rawson ............. B23K 20/1205 29/402.09 |

FOREIGN PATENT DOCUMENTS

| EP | 0 669 183 A1 | 2/1995 |
| EP | 0 850 718 A1 | 7/1998 |

(Continued)

*Primary Examiner* — Gregory Anderson
*Assistant Examiner* — Danielle M Christensen
(74) *Attorney, Agent, or Firm* — Blank Rome LLP

(57) ABSTRACT

A method of friction welding an airfoil (32) onto a rotor disk of a turbine engine, the disk having at its outer periphery a projecting stub (18) onto which the airfoil is to be welded, the method comprising a step consisting in mounting chocks (24) on leading and trailing edges of the stub, the method being characterized in that, before friction welding, the chocks are secured to the stub by welding, and in that during the friction welding operation, the beads of welding (28) between the chocks and the stub are expelled, at least in part, in seams of material (34) that form around the connection zone between the airfoil and the stub and that are subsequently to be removed or eliminated, e.g. by machining.

6 Claims, 2 Drawing Sheets

(51) Int. Cl.
*B23K 20/12* (2006.01)
*B23K 20/26* (2006.01)
*F01D 5/00* (2006.01)
*F01D 5/02* (2006.01)
*B23K 101/00* (2006.01)

(52) U.S. Cl.
CPC .............. *B23K 20/26* (2013.01); *B23P 6/005* (2013.01); *F01D 5/005* (2013.01); *F01D 5/02* (2013.01); *B23K 2201/001* (2013.01); *F05D 2220/30* (2013.01); *F05D 2230/239* (2013.01); *F05D 2230/60* (2013.01); *F05D 2230/80* (2013.01); *F05D 2240/24* (2013.01)

(58) Field of Classification Search
CPC ............. F05D 2230/60; F05D 2230/80; F05D 2230/239; F05D 2240/24; B23K 20/1295; B23K 20/26; B23K 20/1205; B23K 20/12; B23K 20/121; B23K 20/1245; B23K 2201/001; B23P 6/005
USPC .............................. 228/112.1–114.5, 2.1, 2.3
See application file for complete search history.

(56) References Cited

FOREIGN PATENT DOCUMENTS

| | | |
|---|---|---|
| EP | 1 516 690 A1 | 3/2005 |
| JP | 2009-39746 | 2/2009 |

\* cited by examiner

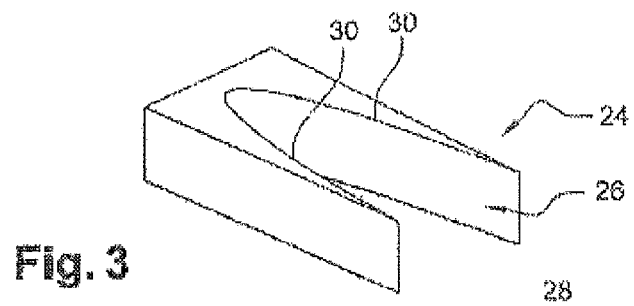
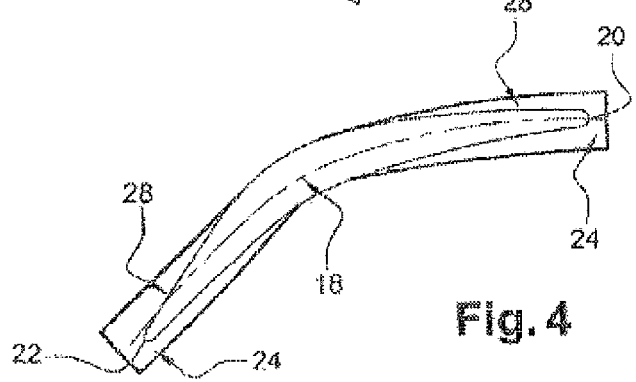
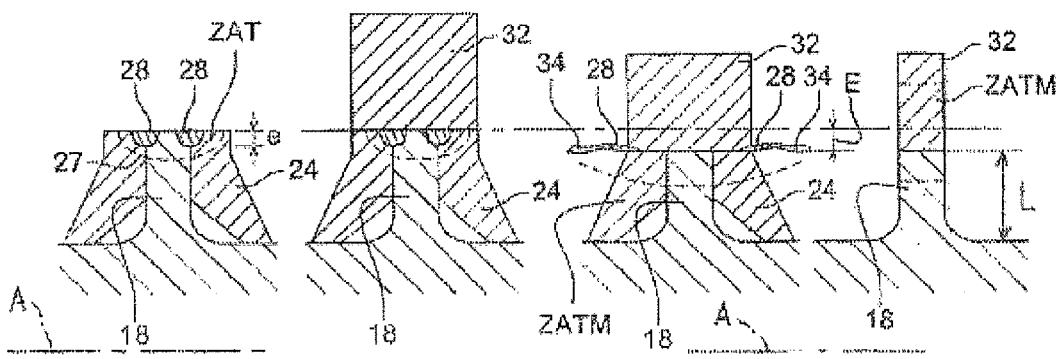
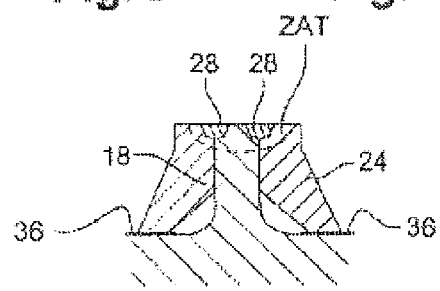

METHOD FOR FRICTION WELDING A BLADE ONTO A TURBINE ENGINE ROTOR DISC; CORRESPONDING INTEGRAL BLADE DISC

The present invention relates to a method of friction welding an airfoil onto a rotor disk of a turbine engine such as an airplane turboprop or turbojet.

A single-piece bladed disk (blisk) for a turbine engine is a rotor disk that has an annular row of substantially radial blades at its outer periphery, which blades are made integrally with the disk. This type of disk can be obtained by friction welding airfoils onto a disk that has projecting stubs at its periphery, the radially inner end of each airfoil being welded to a stub of the disk.

This method can be used for repairing a blisk. When at least one blade of the disk is damaged and needs to be replaced, it is removed, e.g. by machining, such that a stub of material (corresponding to the radially inner end portion of the machined blade) remains at the periphery of the disk for welding on a new airfoil.

Prior patent applications EP-A1-0 669 183 and EP-A1-1 516 690 in the name of the Applicant illustrate the state of the art on this topic.

In the above-mentioned circumstance of repairing a blisk, the stub remaining at the periphery of the disk has a transverse dimension that varies significantly between its main section and its leading edge (and also between its main section and its trailing edge). In one particular example, the ratio between the transverse dimension of the main section and that of the leading edge of a stub is 19. After friction welding, it is found that this large variation in the transverse dimension of the stub gives rise to heterogeneities in the microstructure of the zone where the airfoil connects with the disk. Furthermore, because of the shape of the parts, thermal aspects also need to be taken into account, since the high welding pressure per unit area is greater at the leading and trailing edges of the stub, thereby giving rise to larger zones that are thermo-mechanically affected (ZATM).

In order to remedy those drawbacks, proposals have already been made, in particular in application EP-A1-0 850 718, to mount chocks on the leading and trailing edges of the above-mentioned stub of the disk, each chock having a recess that receives the leading or trailing edge of the stub and that is of a shape that is substantially complementary to the shape of the edge.

Each chock matches the shape of the leading or trailing edge on which it is mounted, and locally increases the transverse size and the strength of the stub, in such a manner as to reduce or even eliminate the above-mentioned drawbacks. The chocks serve to make the transverse size of the welded material more uniform.

In the prior art, as shown by document EP-A1-0 850 718, the chocks are held in place at the periphery of the disk by members that are fastened to the means used for holding the disk by nut-and-bolt type means.

Nevertheless, that technology is not reliable since clearance can exist on assembly between the chocks and the leading and trailing edges of the stub. Furthermore, during friction welding, the chocks may be subjected to high levels of vibration and stress, which can lead to them moving relative to the disk.

A particular object of the present invention is to provide a solution that is simple, effective, and inexpensive to these problems.

For this purpose, the invention provides a method of friction welding an airfoil onto a rotor disk of a turbine engine, the disk having at its outer periphery a projecting stub, or projecting contact, onto which the airfoil is to be welded, the method comprising a step consisting in mounting chocks on leading and trailing edges of the stub, each chock including a recess in which the leading or trailing edge of the stub is received and of a shape that is substantially complementary to the shape of that edge, the method being characterized in that, before friction welding, the chocks are secured to the stub by welding, and in that during the friction welding operation, the beads of welding between the chocks and the stub are expelled, at least in part, in seams of material that form around the connection zone between the airfoil and the stub and that are to be removed or eliminated, e.g. by machining.

Welding the chocks to the stub, also known as "tacking" (shallow welding), prior to friction welding the airfoil to the stub, is particularly advantageous since it enables the chocks to be held stationary relative to the stub and eliminates any clearance between the chocks and the stub. By way of example, the chocks may be welded by laser welding, arc welding (TIG, plasma), fusion welding, etc. The weld beads between the chocks and the stub are advantageously expelled into the seams of material (also known as "flash") that are created during friction welding. The zone that is melted (ZF) during welding of the chocks is thus to be found (after the airfoil has been changed) outside the zone connecting the airfoil to the stub. Since the seams of material are subsequently eliminated, this melted zone is removed and is therefore not to be found in the finished rotor disk. In even more advantageous manner, the zone that is thermally affected (ZAT) by the operation of welding the chocks may also be expelled, at least in part, in the seams. This zone differs from the remainder of the part, in particular by having a micro-structure that is different (grains of a different size) and/or reduced hardness. This zone extends in the stub of the disk in the vicinity of the weld beads of the chocks. In the event of the melted zone and the thermally affected zone both being expelled into the above-mentioned seams, then they have no effect on the soundness of the material in the finished rotor disk.

The airfoil may be welded to the stub by linear or orbital friction welding.

Before friction welding, a weld bead is formed between each chock and the leading or trailing edge of the stub. This weld bead preferably extends continuously along the radially outer peripheral edge of the recess in the chock.

The weld beads of the chocks preferably have a depth or radial dimension relative to the longitudinal axis of the disk that is less than or equal to half the total thickness or radial dimension of material that is consumed during the friction welding. This "total" thickness represents the combined thickness of material consumed both from the airfoil and from the stub. The penetration depth of the weld may be equal to or less than the amount of material that is consumed from the stub. This makes it possible to ensure that at least a portion, and advantageously all, of the zone that is melted by the welding of the chocks is to be found in the seams after friction welding.

The chocks may be made of a material that is identical to the material of the stub and/or of the airfoil, or that has the same chemical basis (main component). By way of example, the rotor disk may be made of a titanium-based alloy, such as Ti17.

Before friction welding, a consumable element that is to be destroyed at least in part during the friction welding may be applied to and fastened against the stub. This step is particularly advantageous when repairing a rotor disk. Specifically, after machining and removing a damaged blade, the stub remaining on the disk already has its final dimensions, and in particular its transverse dimensions are those that the radially inner end portion of the blade is going to have after an airfoil has been friction welded onto the stub and after finishing machining has been performed thereon. The consumable element fitted to the stub before friction welding serves to limit the amount of stub material that is consumed during friction welding.

In order to limit the consumption of the material of the airfoil that is fitted onto the stub, it is possible to overdimension a radially inner end portion (either in localized manner at its leading and trailing edges, or else in generalized manner), this end portion being for machining away after welding in order to bring the blade to its final dimensions.

When fabricating a rotor disk, the projecting stub provided at the periphery of the disk may also be overdimensioned in the design of the disk in order to avoid any need to add a consumable element of the above-mentioned type.

Before friction welding, members for protecting the disk, such as metal sheets, may be interposed between the outer periphery of the disk and of the chocks. This limits any risk of damaging the disk during friction welding, which can lead to crushing forces being transmitted to the disk via the chocks.

The present invention also relates to the use of the above-described method of fabricating a blisk or for repairing a blisk.

The present invention also provides a blisk for a turbine engine, characterized in that it is fabricated or repaired by the above-described method.

The invention can be better understood and other details, characteristics, and advantages of the invention appear on reading the following description made by way of nonlimiting example and with reference to the accompanying drawings, in which:

FIG. 3 is a diagrammatic view in perspective of a chock used in the method of the invention;

FIG. 4 is a highly diagrammatic view of a rotor disk stub and of chocks engaged on the leading and trailing edges of the stub;

FIGS. 5 to 8 are highly diagrammatic fragmentary views in cross-section relative to the longitudinal axis of the disk and sharing a disk stub, chocks mounted on the stub, and an airfoil placed on the stub, showing steps of the method of the invention; and FIG. 9 is a view similar to the view of FIG. 5 and shows a variant implementation of the method of the invention, wherein protective members are interposed between the chocks and the periphery of the rotor disk.

Figure 1:
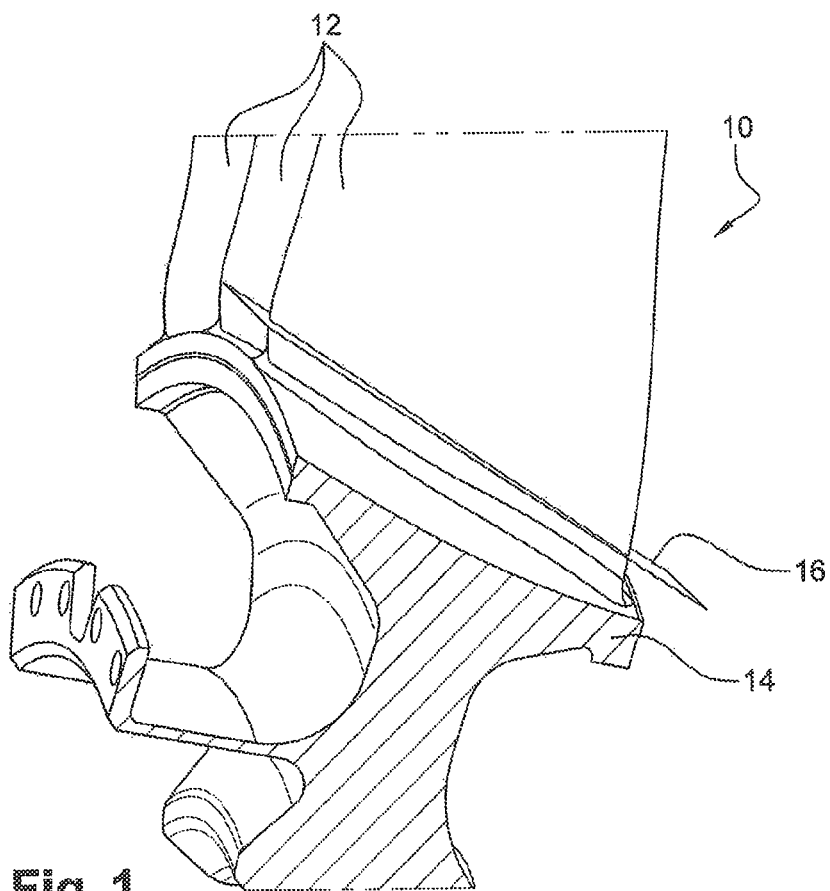
FIG. 1 is a fragmentary diagrammatic view in perspective of a turbine engine blisk.

Reference is made initially to FIG. 1, which shows a portion of a single-piece bladed disk (blisk) 10 for a turbine engine, this disk 10 having an annular row of blades 12 extending substantially radially to the longitudinal axis of the disk and formed integrally with the disk. The blades 12 are connected at their radially inner ends to an annular platform 14 that extends at the outer periphery of the disk.

In the event of the blades 14 becoming damaged, it is possible to remove them by machining for the purpose of replacing them. Reference 16 in FIG. 1 specifies a section plane of a blade 12 that is to be replaced, this section plane extending substantially parallel to and at a distance from the outer annular surface of the platform 14.

The distance between the platform 14 and the join plane 16 is determined so that a stub of material (corresponding to the radially inner portion of the blade extending between the platform 14 and the section plane 16) remains on the platform 14 to serve as a support onto which a new blade airfoil can be fastened by friction welding.

Figure 2:
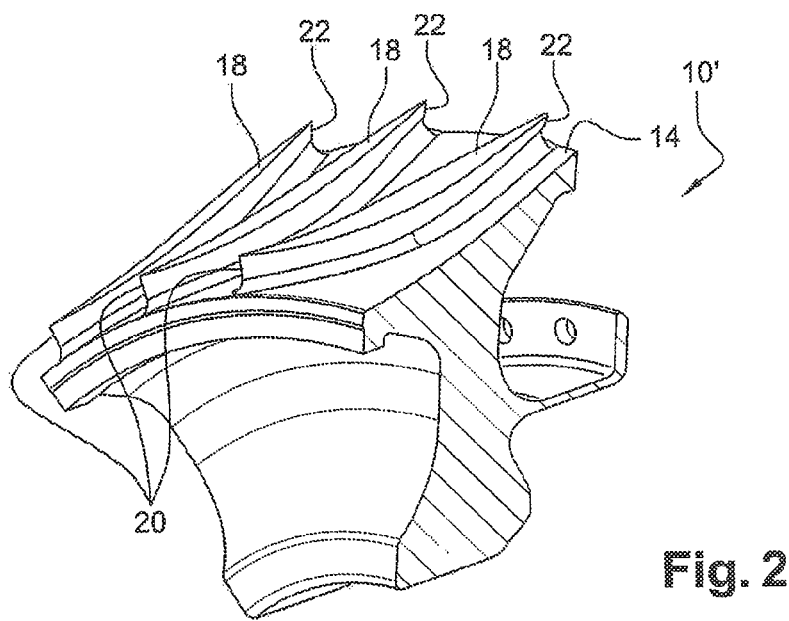
FIG. 2 is a fragmentary diagrammatic view in perspective of the FIG. 1 blisk after its blades have been machined for replacement purposes.

FIG. 2 shows a rotor disk 10' carrying an annular row of stubs 18 of the above-specified type at its periphery. This disk 10' may be obtained by machining and removing blades from a blisk 10 for the purpose of repairing the blisk, as explained above. Alternatively, it may be obtained directly, e.g. by casting, the purpose of fabricating a blisk. Under such circumstances, the stubs are made during fabrication of the disk, and each of them is to receive a blade airfoil.

As can be seen in FIG. 2, each stub has a leading edge 20 and a trailing edge 22, which edges are connected together by a pressure side and a suction side.

An airfoil (not shown) is fastened on each stub 18 of the disk by linear or orbital friction welding. In order to avoid the above described problems associated with the large amount of variation in the transverse size of the stub 18 between its main cross-section and is leading and trailing edges 20 and 22, it is known to mount chocks, or mounting stops, 24 on the leading and trailing edges of each stub 18 (FIGS. 3 and 4).

The chocks 24 serve to make the transverse size of the welded material more uniform. Specifically, they are often configured to limit variations in the transverse size of material (seen by the airfoil), with the ratio between the transverse size of the main cross-section of the stub and the transverse size of the chocks at the leading and trailing edges of the stub being less than or equal to two, with an acceptable maximum of three, for example.

A chock 24 is generally made of a block of material that has a recess 26 for engaging around the leading edge or the trailing edge of the stub. This recess 26 is shaped to fit closely to the shape of the corresponding edge, as can be seen in FIG. 4. In the example shown, the chock 24 is substantially U-shaped and has two lateral tabs on either side of the recess 26. In the assembled position, each chock is engaged on the leading or trailing edge of a stub and rests on the radially outer surface of the platform 14 of the disk.

The method of the invention serves to remedy the drawbacks of the prior art associated with the use of such chocks 24, by welding or "tacking" the chocks to the stubs 18 before friction welding an airfoil on a stub.

In an implementation of the invention as shown in FIG. 4, a bead of welding 28 is formed continuously between the radially outer peripheral edge 30 of the recess 26 of each chock 24 and the leading edge or the trailing edge of the stub 18. This weld bead 28 may be made by laser welding, by arc welding (TIG, plasma, etc.), or any other type of welding, and preferably it is made to a depth or radial dimension that is small compared with the radial or transverse dimension L of the stub 18. Preferably, before being welded, the chocks 24 are separated from the leading and trailing edges 20 and 22 of the stub 18 by clearances of no more than 1 mm.

FIGS. 5 to 8 show steps of the method of the invention.

In FIG. 5, the chock 24 is engaged on one of the above-mentioned edges 20, 22 of the stub 18, with its lateral tabs extending on either side of the stub. The weld bead 28 extends between the stub 18 and the chock 24 along the outer peripheral edge of the recess in the chock, as explained above. The weld bead 28 has a depth or radial dimension relative to the longitudinal axis (A, FIG. 5) of the disk that is written e. The weld bead 28 represents the zone of melting (ZF) during the operation of welding the chock, and the dashed lines 27 outline a zone that is thermally affected (ZAT) by the welding operation. In the particular circumstance of the stub 18 being made of Ti17, the hardness of the alloy of the stub in the ZAT is of the order of 300 to 350 on the Vickers hardness scale (HV) and is of the order of 370 HV to 400 HV outside that zone.

The variant implementation shown in FIG. 9 differs from the implementation of FIG. 5 in that at least one protective metal sheet 36, of the "sacrificial" type, is interposed between the radially outer surface of the platform 14 of the disk and the chock 24. This sheet 36 avoids damage to the disk during the operation of welding the chock 24 and during the operation of friction welding the airfoil on the stub 18.

In FIG. 6, a new airfoil 32 is placed on the stub 18 of the disk, with the radially inner end of this airfoil that is to be connected to the stub 24 possibly being overdimensioned, in particular in the transverse direction, or not if the stub possesses extra thickness that can be machined after repair.

Linear or orbital friction welding is then performed in the manner known to the person skilled in the art.

At the end of the friction welding step, and as shown in FIG. 7, the airfoil 32 has its radially inner end connected to the stub 18, with a portion of the material of the stub and of the airfoil being consumed during the welding operation, thereby reducing their radial dimensions (dimensions along radii relative to the axis A).

One half of the (total) thickness of material that is consumed during friction welding is written E, this thickness being equal to the thickness of material that is consumed from the stub 18 and the thickness of material that is consumed from the radially inner end of the airfoil 32. When the airfoil and the disk are made out of the same material (homogeneous welding), the quantity of material consumed from the stub should be similar to the quantity consumed from the airfoil. In contrast, when these items are made of different materials or of alloys having different compositions (heterogeneous welding), then the material consumed from one of these items may be greater than that consumed from the other one.

For titanium-based alloys, the total consumption of material lies in the range 4 millimeters (mm) to 10 mm approximately when performing homogeneous welding. When assembling parts made of Ti17, the consumption of material from the stub may be greater than or equal to 2 mm.

Preferably, the depth e of the weld bead 28 is less than or equal to half the thickness E of material consumed during friction welding. When the depth e is less than half the thickness E, the entire weld bead 28 (i.e. the zone that was melted) is expelled with the flash or seam of material 34 that forms around the chock 24 during the friction welding. By way of example, the depth e may be less than or equal to 2.5 mm.

Advantageously, the above-mentioned zone ZAT that is thermally affected is also expelled in these seams 34 during friction welding. In the event of a portion of the ZAT remaining in the useful zone of the stub, it becomes kneaded as a result of the friction and forging forces during friction welding. Its grains can thus be made smaller and return to a size less than or equal to the size of the grains in the base material.

Friction welding generates a zone ZATM that is thermo-mechanically affected as outlined by dashed lines in FIG. 7. In the particular situation mentioned above in which the stub 18 is made of Ti17, the hardness of the alloy in the ZATM is of the order of 300 HV to 350 HV, and this zone presents a reduction in grain size compared with the remainder of the stub.

At the end of friction welding, the airfoil 32 is held by its radially inner end to the stub 18 and to the chocks 24 that are situated at the leading and trailing edges of the stub.

The following step consists in machining the disk in order to remove the chocks 24, the seams 34, and the extra thicknesses of material initially provided on the radially inner portion of the airfoil 32. FIG. 8 shows a blade having its final dimensions for a blisk after this machining step. The dashed lines mark the above-mentioned zone ZATM that is thermo-mechanically affected by the friction welding operation. The disk may be subjected to other additional treatments, such as shot-blasting, heat treatment, etc.

The invention claimed is:

1. A method of friction welding an airfoil onto a rotor disk of a turbine engine, the disk having at its outer periphery a projecting stub onto which the airfoil is to be welded, the method comprising a step consisting in mounting chocks on leading and trailing edges of the projecting stub, each chock including a recess in which the leading or trailing edge of the projecting stub is received and of a shape that is substantially complementary to the shape of that edge, the method comprising:

before friction welding, the chocks are secured to the projecting stub by welding;

during the friction welding operation, weld beads formed before the friction welding operation between the chocks and the projecting stub are expelled, at least in part, in seams of material that form around the connection zone between the airfoil and the projecting stub and that are subsequently to be removed or eliminated by machining; and the weld beads of the chocks have a depth or radial dimension relative to the longitudinal axis of the disk that is less than or equal to half the total thickness of material that is consumed during the friction welding, said total thickness being the combined thickness of material that is consumed from the airfoil and from the projecting stub.

2. The method of claim 1, wherein before friction welding, a weld bead is formed between each chock and the leading or trailing edge of the projecting stub.

3. The method of claim 2, wherein the weld bead between each chock and the leading or trailing edge of the projecting stub extends continuously along the radially outer peripheral edge of the recess in the chock.

4. The method of claim 1, wherein the chocks are made of identical material having a main chemical component that is identical to a main chemical component of the projecting stub and of the airfoil.

5. The method of claim 1, wherein before friction welding, members for protecting the disk are interposed between the outer periphery of the disk and the chocks.

6. The use of the method of claim 1 for fabricating a blisk or for repairing a blisk.

* * * * *